(12) United States Patent
Chang

(10) Patent No.: US 8,511,958 B2
(45) Date of Patent: Aug. 20, 2013

(54) SCREW WITH DOUBLE NOTCHES

(75) Inventor: Ching-Hsiang Chang, Tainan County (TW)

(73) Assignee: Essence Method Refine Co., Ltd., Tainan County (TW)

( * ) Notice: Subject to any disclaimer, the term of this patent is extended or adjusted under 35 U.S.C. 154(b) by 359 days.

(21) Appl. No.: 12/952,564

(22) Filed: Nov. 23, 2010

(65) Prior Publication Data
US 2011/0293387 A1 Dec. 1, 2011

(30) Foreign Application Priority Data

May 25, 2010 (TW) ................................ 99209860 U

(51) Int. Cl.
*F16B 25/10* (2006.01)

(52) U.S. Cl.
USPC .................. 411/387.1; 411/387.7; 411/387.8; 411/411; 411/418; 411/424

(58) Field of Classification Search
USPC ............. 411/387.1, 387.6, 387.7, 387.8, 411, 411/417, 418, 420, 421, 424
See application file for complete search history.

(56) References Cited

U.S. PATENT DOCUMENTS

| | | | | |
|---|---|---|---|---|
| 66,766 A * | 7/1867 | Young | ............................ | 411/418 |
| 142,112 A * | 8/1873 | Ladd et al. | ..................... | 411/421 |
| 429,851 A * | 6/1890 | Ericson | ......................... | 411/418 |
| 453,563 A * | 6/1891 | Nicholson | ..................... | 411/418 |
| 924,273 A * | 6/1909 | Rehse | ............................ | 411/418 |
| 1,465,148 A * | 8/1923 | Rosenberg | .................... | 411/418 |
| 2,314,897 A * | 3/1943 | Purinton | ..................... | 24/101 R |
| 3,789,725 A * | 2/1974 | Lindstrom | ................ | 411/387.7 |
| 4,697,969 A * | 10/1987 | Sparkes | ..................... | 411/387.7 |
| 5,120,172 A * | 6/1992 | Wakai | ......................... | 411/387.8 |
| 6,015,252 A * | 1/2000 | Peck | ........................... | 411/387.1 |
| 6,106,208 A * | 8/2000 | Lin | ............................... | 411/418 |
| 6,176,664 B1 * | 1/2001 | Roberts | ..................... | 411/387.1 |
| 6,558,097 B2 * | 5/2003 | Mallet et al. | ................. | 411/399 |
| 6,676,353 B1 * | 1/2004 | Haytayan | ..................... | 411/442 |
| 2002/0168245 A1 * | 11/2002 | Kuo-Tai | ..................... | 411/387.1 |
| 2003/0082027 A1 * | 5/2003 | Lin | ............................ | 411/387.1 |
| 2007/0286701 A1 * | 12/2007 | Hsu | ............................ | 411/387.1 |

* cited by examiner

Primary Examiner — Roberta Delisle
(74) Attorney, Agent, or Firm — Rosenberg, Klein & Lee

(57) ABSTRACT

A screw with double notches includes a head portion, a shank portion extended outward from the head portion, a threaded section spirally surrounded on the shank portion. Wherein, a raw section on the shank portion is provided with a cambered surface formed integral with the shank portion in cross-section, and a notched section relative to the raw section has two cutting notches separately depressed into the shank portion and disposed near an end of the shank portion, thereby forming a protrudent part between the two cutting notches. By means of the cooperation of the cutting notches and the raw section, the cutting capability and the removal of debris are increased so that a fastened object is prevented from split. Thereby, the drilling speed is promoted, and the effort to rotate the screw is lessened. While the supporting strength of the screw is improved, the screw does not break easily while screwing.

13 Claims, 10 Drawing Sheets

SCREW WITH DOUBLE NOTCHES

BACKGROUND OF THE INVENTION

1. Field of the Invention

The present invention relates to a screw, particularly to a screw with double notches.

2. Description of the Related Art

Referring to FIGS. 1 and 2, a conventional screw 1 comprises a head portion 11, a shank portion 12 extended outward from the head portion 11, a threaded section 13 spirally surrounded on the shank portion 12, and a cutting notch 14 defined on the shank portion 12. Wherein, a drilling portion 121 is formed on one end of the shank portion 12, opposite to the head portion 11. A drilling tip 1211 is further defined on a distal end of the drilling portion 121. The cutting notch 14 is defined on the shank portion 12 and extended toward the drilling portion 121. By imparting a drilling torque upon the head portion 11, the threaded section 13 is able to assist the screw 1 in drilling into an object 2. Herein, the cutting notch 14 preferably scrapes away and severs the wood fiber of the object 2 into debris to facilitate the removal of the debris, and the redundant debris without being removed out of the object 2 thence enters the cutting notch 14. Thereby, the screw 1 achieves a fixing ability.

However, the screw 1 has the following disadvantages:

1. The single cutting notch 14 is in fact unable to thoroughly sever the wood fiber of the object 2 tangling on the shank portion 12. Thus, the unsevered wood fiber adversely results in the increased drilling resistance. Moreover, the sole cutting notch 14 on the shank portion 12 cannot provide an adequate room for accommodating and timely extruding debris. Thus, the debris that is untimely extruded will block up the cutting notch 14, and the situation even becomes worse since the rest of the debris subsequently enters the constricted cutting notch 14. As a result, the crowded cutting notch 14 thence brings about a split object 2.

2. As aforementioned, the debris blocking up the constricted cutting notch 14 unbeneficially increases the drilling resistance and influences the drilling speed. Herein, if the object 2 is made of a material having the property of high density, more drilling torque imparted on the screw 1 is thence needed as a huge drilling resistance occurs on the blocked cutting notch 14. As a result, the construction on the cutting notch 14 might be abraded, and the shank portion 12 might be broken.

SUMMARY OF THE INVENTION

It is therefore the purpose of this invention to provide a screw with double notches for decreasing the drilling torque and enhancing the drilling speed, thereby preventing a fastened object from damage, and thence avoiding the screw from breaking in time of operation.

The screw with double notches in accordance with the present invention comprises a head portion, a shank portion extended outward from the head portion, and a threaded section spirally surrounded on the shank portion. Wherein, the shank portion comprises a drilling portion formed at one end thereof, opposite to the head portion, a drilling tip disposed at a distal end of the drilling portion, and an axis defined along a center of the shank portion. Characterized in that the shank portion is cross-sectionally divided into a raw section and a notched section disposed relatively to the raw section. Wherein, the raw section is provided with a cambered surface formed integral with the shank portion in cross-section, and the notched section has two cutting notches separately depressed into the shank portion so that a protrudent part is formed between the two cutting notches. Moreover, the cutting notches are disposed near an end of the shank portion.

Preferably, at least one debris-extruding slot is extendedly formed on the shank portion and defined between the notched section and the head portion.

Preferably, the cutting notches have different lengths.

Preferably, the cutting notches are merely disposed on the drilling portion.

Preferably, an area of the notched section is larger than an area of the raw section.

Preferably, the cutting notches are disposed parallel to the central axis of the shank portion.

Preferably, the cutting notches are disposed inclined to the central axis of the shank portion.

Preferably, the cutting notches are extended from the drilling portion throughout the shank portion but short of the head portion.

DETAILED DESCRIPTION OF THE PREFERRED EMBODIMENTS

Figure 1:
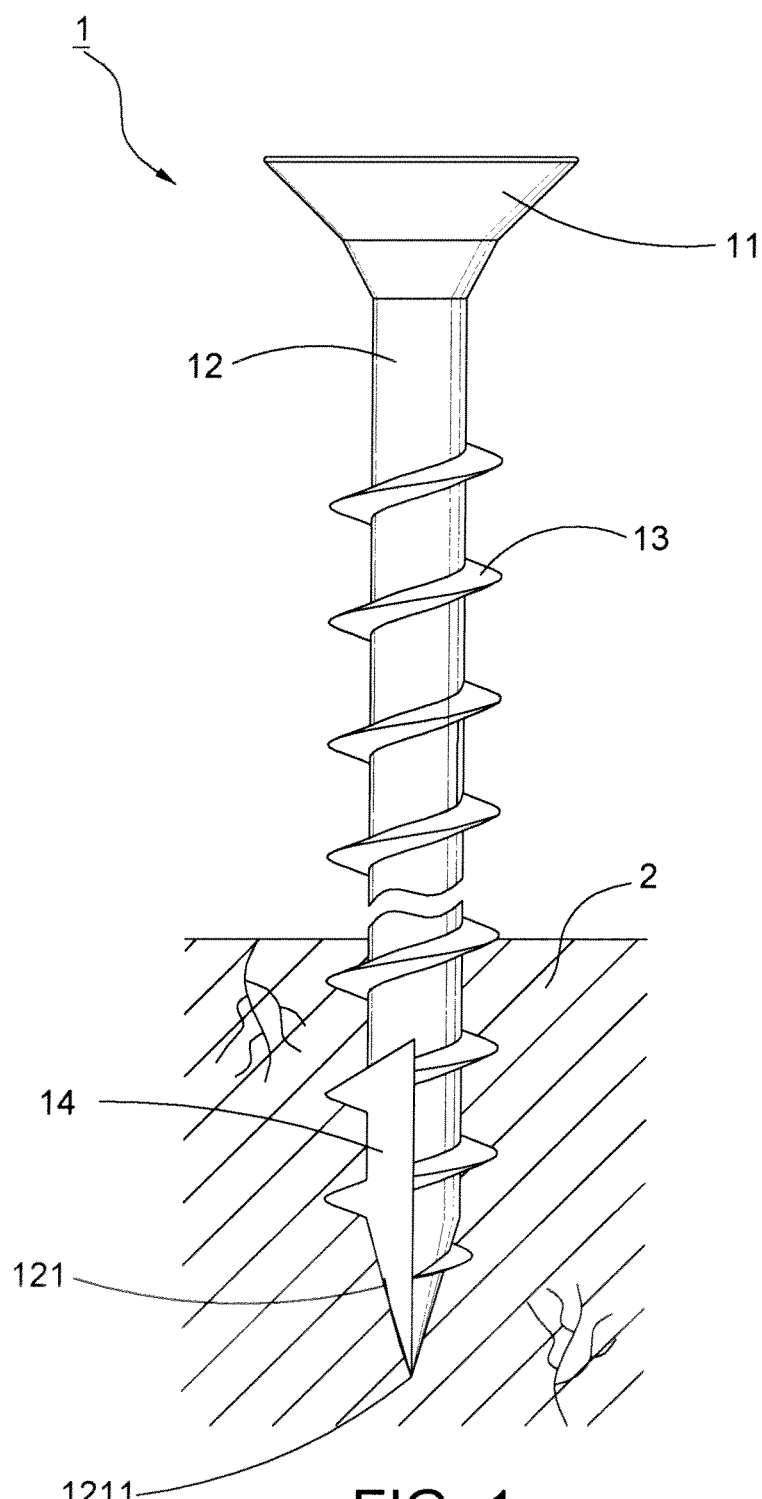
FIG. 1 is a schematic view showing a conventional screw.
Figure 2:
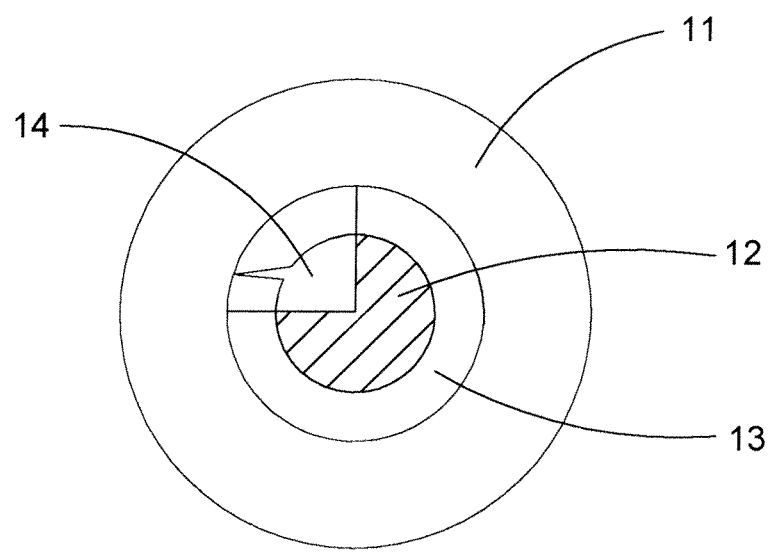
FIG. 2 is a cross-sectional view of FIG. 1.

Wherever possible, the same reference numbers are used in the drawings and the description to refer to the same or like parts.

Figure 3:
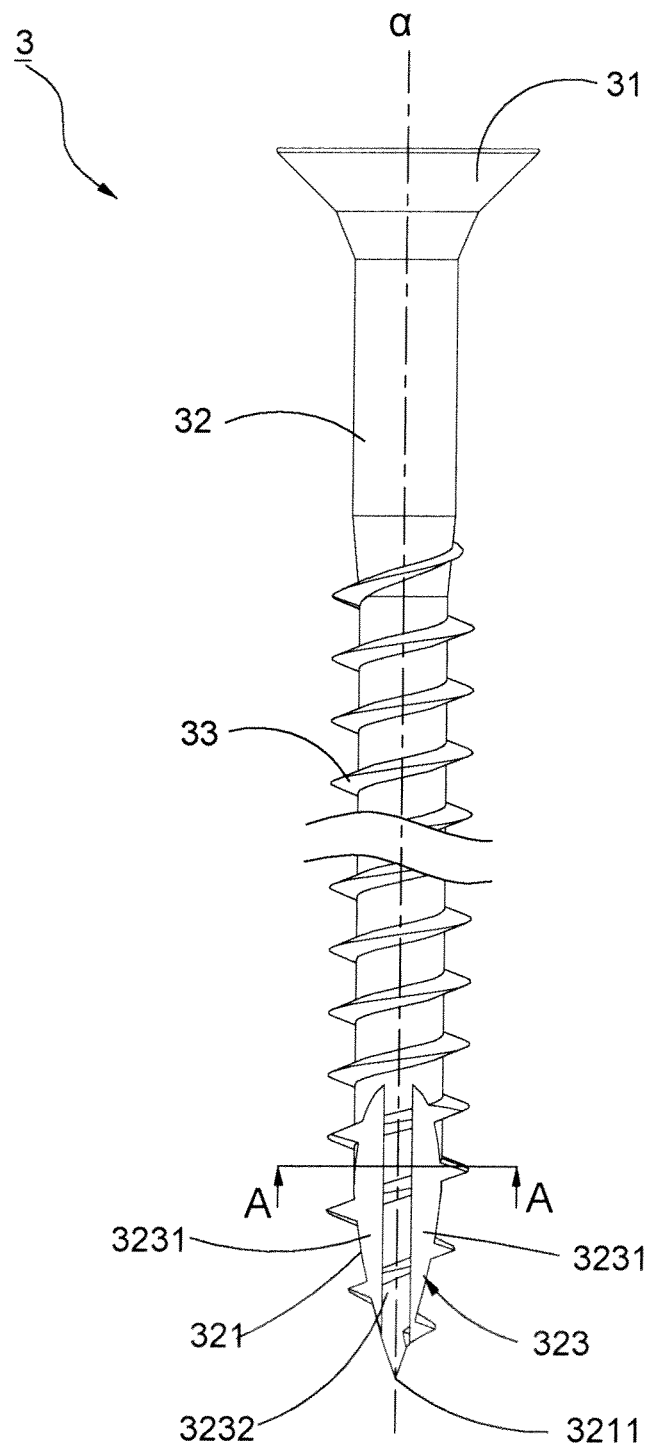
FIG. 3 is a front view showing a first preferred embodiment of the present invention.
Figure 4:
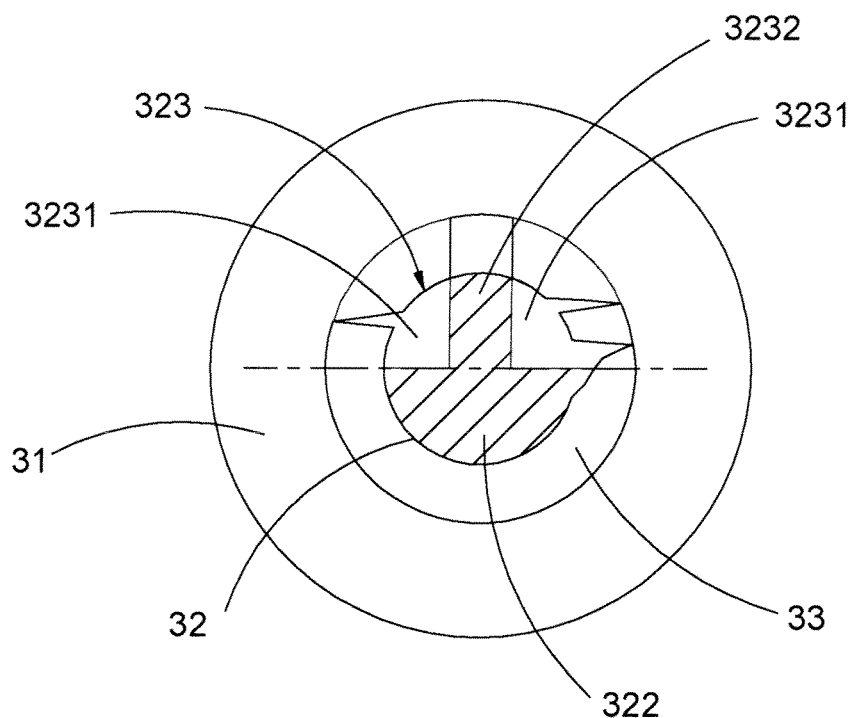
FIG. 4 is an A-A cross-sectional view of FIG. 3.

Referring to FIGS. 3 and 4, a first preferred embodiment of the present invention is shown. A screw 3 with double notches comprises a head portion 31, a shank portion 32 extended outward from the head portion 31, and a threaded section 33 spirally surrounded on the shank portion 32. Wherein, the shank portion 32 comprises a drilling portion 321 formed at one end thereof, opposite to the head portion 31, a drilling tip 3211 disposed at a distal end of the drilling portion 321, and an axis α defined along a center of the shank portion 32.

Figure 5:
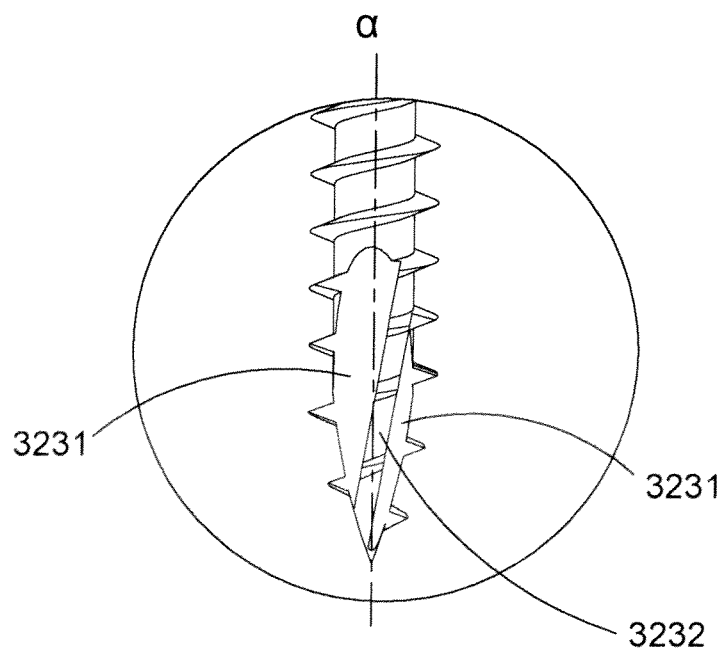
FIG. 5 is a partial front view showing a second preferred embodiment of the present invention.
Figure 6:
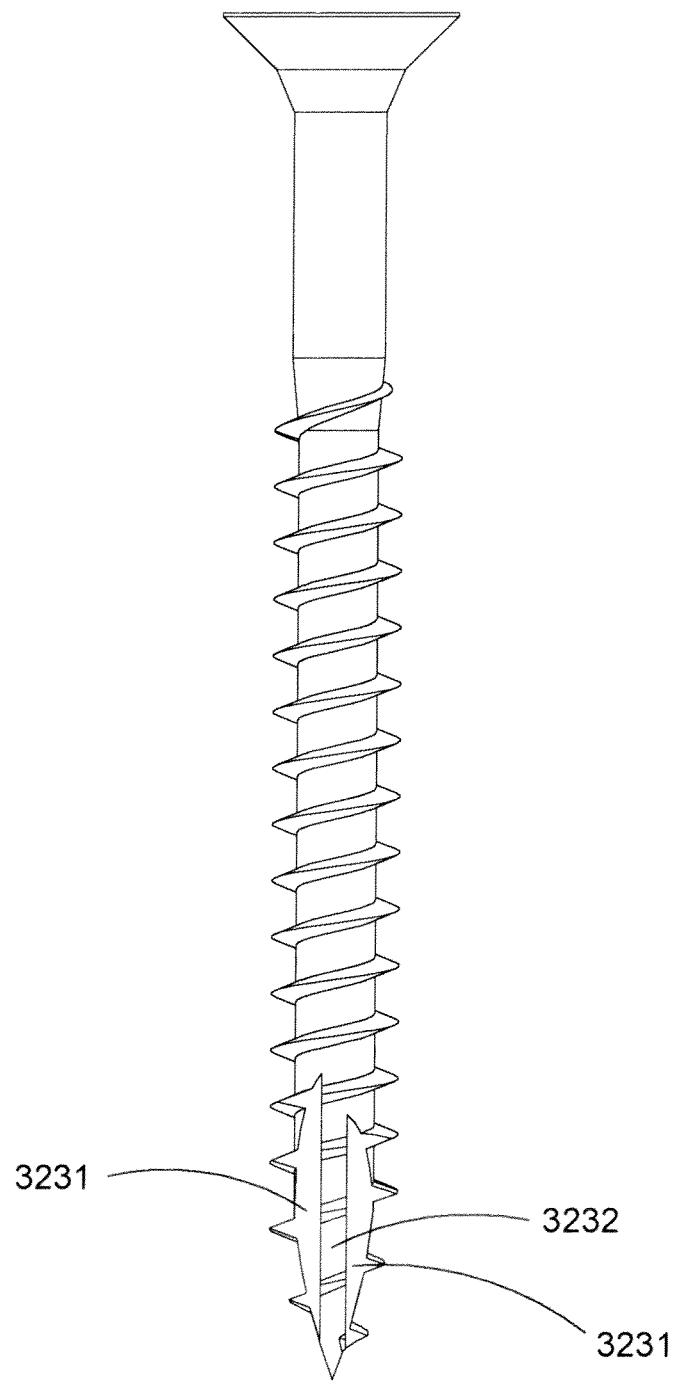
FIG. 6 is another schematic view showing the first preferred embodiment of the present invention.

Continuingly, the shank portion 32 is cross-sectionally divided into a raw section 322 and a notched section 323 disposed relatively to the raw section 322. Wherein, the raw section 322 is provided with an cambered surface formed integral with the shank portion 32 in cross-section, and the notched section 323 has two cutting notches 3231 separately depressed into the shank portion 32 so that a protrudent part 3232 is formed between the two cutting notches 3231. Alternatively, the cutting notches 3231 could be extended upward from the drilling portion 321. In this embodiment, the cutting notches 3231 are merely disposed on the drilling portion 321. Further, the disposition of the cutting notches 3231 is parallel to the central axis α. As it should be, the disposition of the cutting notches 3231 could be alternatively inclined to the central axis α as shown in FIG. 5. The following description mainly focuses on the disposition of the cutting notches parallel to the central axis α. In addition, the cutting notches 3231 could have the same length or the different lengths (as shown in FIG. 6). The cutting notches 3231 with the same length are depicted as follows.

Referring to FIGS. 3 and 4, in operation, setting the drilling tip 3211 against an object (not shown) and imparting a drilling torque upon the head portion 31 preferably bring the screw 3 into the object. Herein, the dual and parallel cutting notches 3231 render a favorable severing function. Therefore, the wood fiber contained in the object and entangled on the shank portion 32 is able to be thoroughly cut off and efficiently extruded from the object via the threaded portion 33, which increases the drilling speed of the screw 3. Moreover, rest of the severed debris not extruded thence smoothly gets into the cutting notches 3231 since a larger room is provided by the dual cutting notches 3231 for accommodating the considerable debris. In fact, the dual cutting notches 3231 also allow the debris generated during the operation to be extruded therefrom toward an interstice between any two threads. Thereby, the drilling speed is promoted, the effort to screw the screw is lessened, and the object is prevented from split since the debris is timely extruded without an extra accumulation. Moreover, the raw section 322 further provides the screw with a supporting force when the cutting notches 3231 execute scraping and severing the fibers of the object. That is, the raw sections 322 aids the cutting notches 3231 in having adequate force to scrape the object, so that the drilling strength of the screw 3 is enhanced, and the breakage of the screw 3 can be efficiently avoided during the operation.

Figure 7:
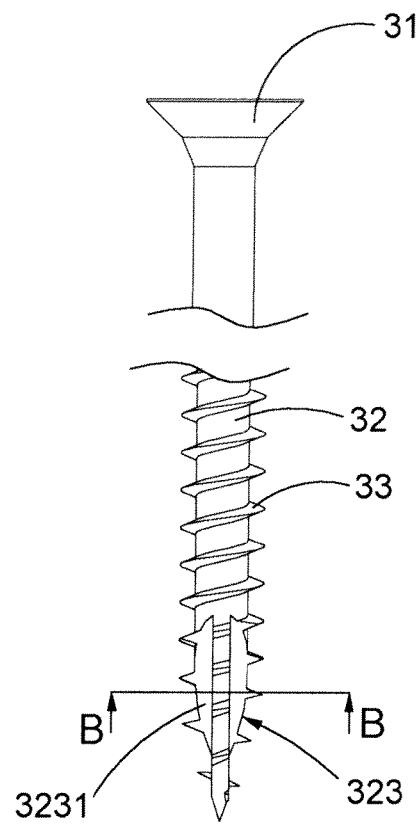
FIG. 7 is a perspective view showing a third preferred embodiment of the present invention.
Figure 8:
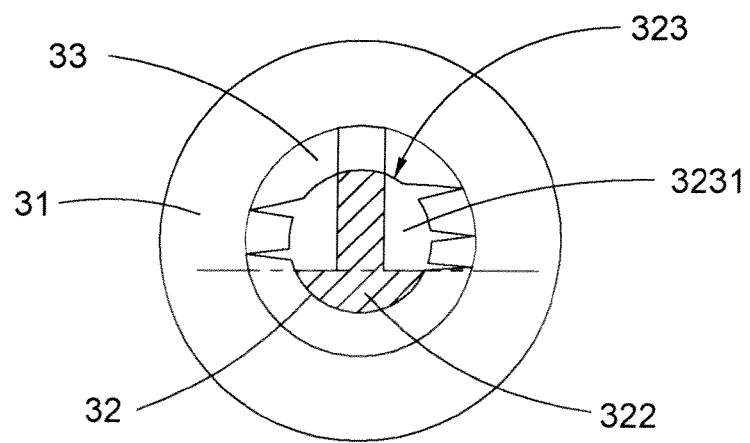
FIG. 8 is a B-B cross-sectional view of FIG. 7.

Referring to FIGS. 7 and 8, a third preferred embodiment of the present invention is shown. The elements like the head portion 31, the shank portion 32, and the threaded section 33 same to those in the first preferred embodiment are hereby omitted. In this embodiment, an area of the notched section 323 is larger than an area of the raw section 322, which increases the room in the cutting notches 3231 to accommodate more debris. Further, the increased areas also reduce the contact region between the raw section 322 and the object while screwing. Thus, besides giving an improved cutting capability reduce the drilling resistance and enhance the debris accommodating and extruding effect, the friction between the raw section 322 and the object also becomes lessened. Therefore, the subject configuration attains effects of increasing the drilling speed and avoiding damaging the object and the screw 3 during the operation.

Figure 9:
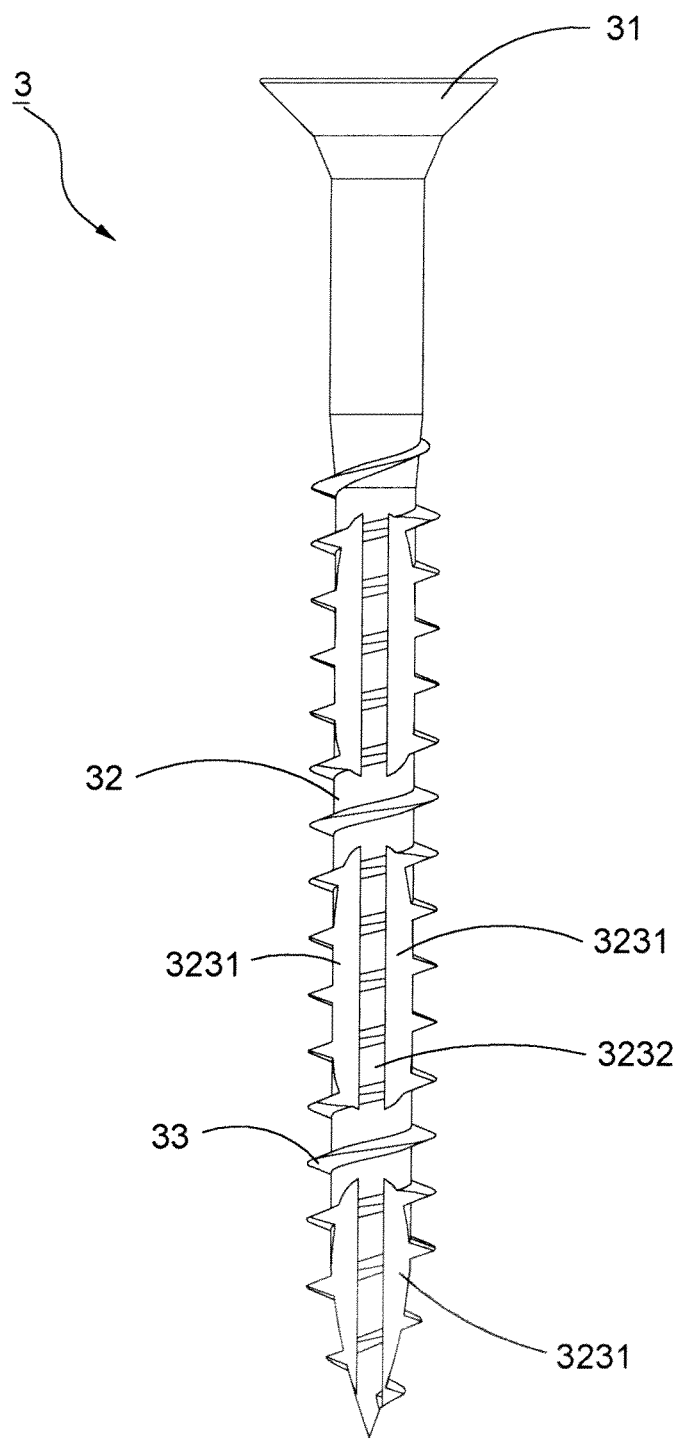
FIG. 9 is a perspective view showing a fourth preferred embodiment of the present invention.
Figure 10:
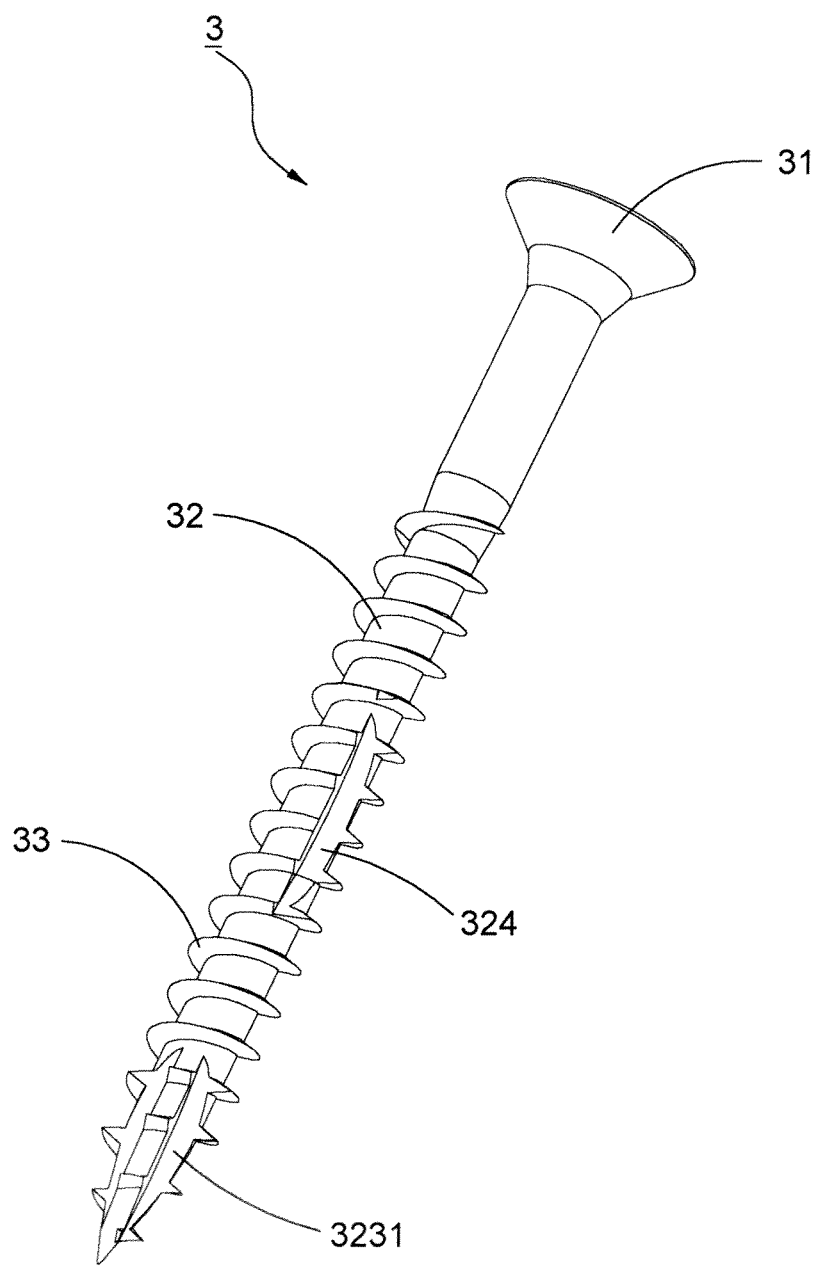
FIG. 10 is a perspective view showing a fifth preferred embodiment of the present invention.

FIG. 9 shows a fourth preferred embodiment of the present invention. The elements like the head portion 31, the shank portion 32, and the threaded section 33 similarly to those in the first preferred embodiment are hereby omitted. As it should be, several sets of the cutting notches 3231 and various sets of the protrudent part 3232 could be additionally disposed on the shank 32 at intervals. Preferably, at least one debris-extruding slot 324 could be alternatively formed on the shank portion 32 and defined between the cutting notches 3231 and the head portion 31. Herein, one debris-extruding slot 324 is adopted as shown in FIG. 10. By means of the debris-extruding slots 324, an extra room for accommodating more debris is provided to decrease the drilling resistance. Thus, the debris does not block up between the screw 3 and the object, which not only prevents the screw 3 from breakage but keeps the object from split. Favorably, the subsequent screwing becomes more effortless and swifter.

Figure 11:
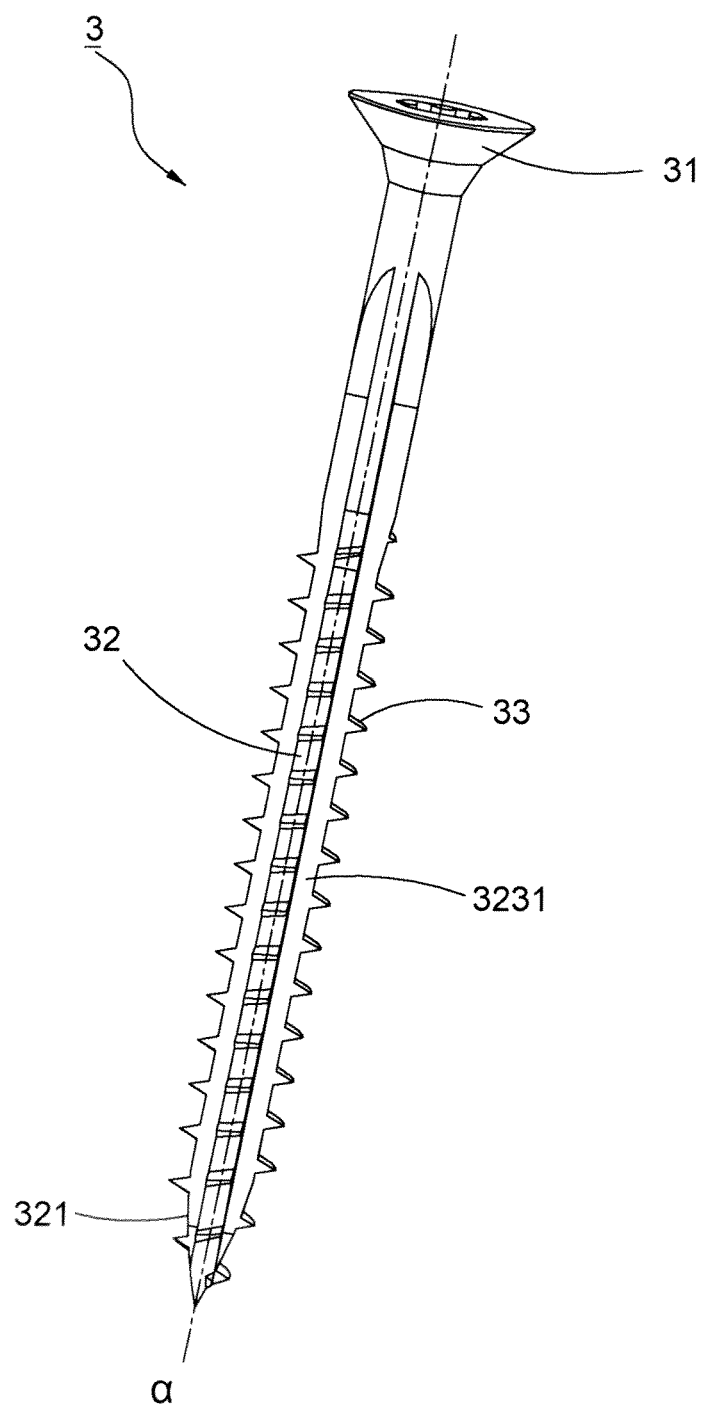
FIG. 11 is a perspective view showing a sixth preferred embodiment of the present invention.
Figure 12:
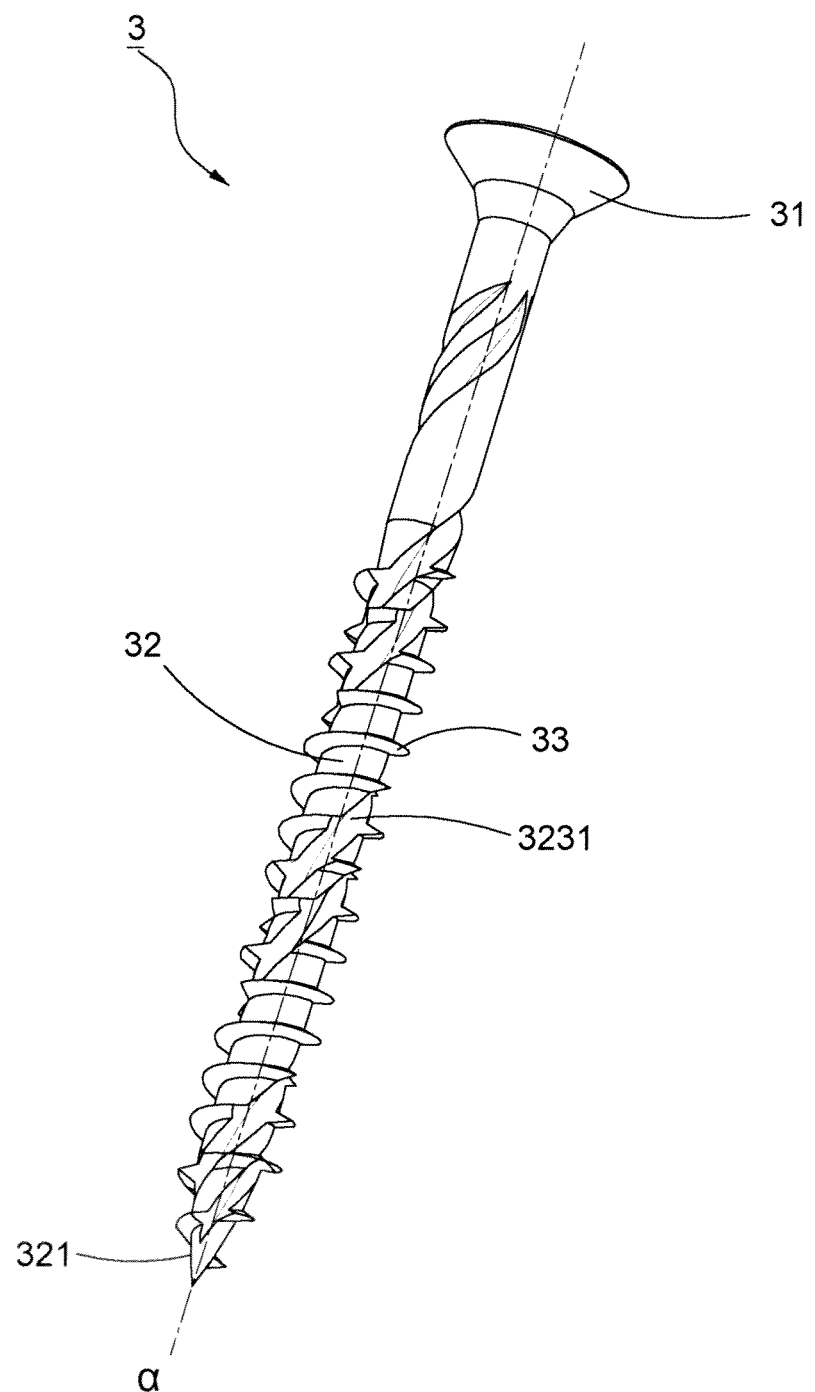
FIG. 12 is another perspective view showing the sixth preferred embodiment of the present invention.

FIG. 11 shows a sixth preferred embodiment of the present invention. The elements like the head portion 31, the shank portion 32, and the threaded section 33 similarly to those in the first preferred embodiment are hereby omitted. In this embodiment, the cutting notches 3231 are extended from the drilling portion 321 throughout the shank portion 32 but short of the head portion 31. Alternatively, the cutting notches 3231 could be spirally distributed on the shank 32 as shown in FIG. 12. In this embodiment, the distributions of the cutting notches 3231 are parallel to the central axis α of the shank 32. Accordingly, a larger room is provided for accommodating and extruding the considerable debris in time of screwing. Thus, a better extruding effect allows the fastened object to be prevented from split. Thereby, the drilling speed is promoted, and the effort to screw the screw is lessened.

To sum up, the present invention particularly utilizes the cutting notches formed within the notched section to accelerate the drilling speed and lessen the screwing effort so as to prevent the fastened object from split. With respect to the raw section, a further supporting force is provided for the screw to be powerfully drilled into the object. Thus, the screw does not break easily.

While we have shown and described the embodiment in accordance with the present invention, it should be clear to those skilled in the art that further embodiments may be made without departing from the scope of the present invention.

I claim:

1. A screw with double notches comprising:
a head portion,
a shank portion extended outward from said head portion; said shank portion including a drilling portion formed at one end thereof, opposite to said head portion, a drilling tip disposed at a distal end of said drilling portion, and an axis defined along a center of said shank portion;
wherein, at least a part of said shank portion is cross-sectionally divided into a raw section and a notched section disposed relatively to said raw section; said raw section being provided with cambered surface formed integrally said shank portion in cross-section, said notched section having two cutting notches each arcuately depressed into said shank portion along one said cambered surface at opposing sides of a protrudent part extending axially therebetween; said cutting notches being disposed near an end of said shank portion; and
a threaded section spirally surrounded on said shank portion.

2. The screw as claimed in claim 1, wherein, at least one debris-extruding slot is extendedly formed on said shank portion and defined between said notched section and said head portion.

3. The screw as claimed in claim 2, wherein, said cutting notches have different lengths.

4. The screw as claimed in claim 2, wherein, the cutting notches are merely disposed on said drilling portion.

5. The screw as claimed in claim 2, wherein, an area of said notched section is larger than an area of said raw section.

6. The screw as claimed in claim 2, wherein, said cutting notches are disposed parallel to said central axis of said shank portion.

7. The screw as claimed in claim 2, wherein, said cutting notches are disposed inclined to said central axis of said shank portion.

8. The screw as claimed in claim 1, wherein, said cutting notches have different lengths.

9. The screw as claimed in claim 1, wherein, the cutting notches are merely disposed on said drilling portion.

10. The screw as claimed in claim 1, wherein, an area of said notched section is larger than an area of said raw section.

11. The screw as claimed in claim 1, wherein, said cutting notches are disposed parallel to said central axis of said shank portion.

12. The screw as claimed in claim 1, wherein, said cutting notches are disposed inclined to said central axis of said shank portion.

13. The screw as claimed in claim 1, wherein, said cutting notches are extended from said drilling portion throughout said shank portion but short of said head portion.

\* \* \* \* \*